United States Patent Office 3,510,510
Patented May 5, 1970

3,510,510
NOVEL REACTIONS OF 4-ACYLOXY-3-CARANOLS AND NOVEL BICYCLIC COMPOUNDS RESULTING FROM SAID REACTIONS
Paul J. Kropp, Springfield Township, Hamilton County, Ohio, assignor to The Procter & Gamble Company, Cincinnati, Ohio, a corporation of Ohio
No Drawing. Filed June 30, 1966, Ser. No. 561,720
Int. Cl. C07c 35/22, 49/44, 69/14
U.S. Cl. 260—489                                9 Claims

ABSTRACT OF THE DISCLOSURE

Reaction of 4-acyloxy-3-carnols with dehydrating agents, e.g., phosphorous oxychloride, to produce 4-acyloxy-3-(10)-carenes and 2-acyloxy-4-isopropenyl-1-methyl-bicyclo[3.1.0]-hexanes, novel compounds, is disclosed. The products of the reaction have desirable odor characteristics and are useful in perfume compositions.

---

This invention relates to novel dehydration reactions of 4-acyloxy-3-caranols and to novel 4-isopropenylbicyclo-[3.2.0.]hexane compounds resulting from said reactions.

More specifically, it has been discovered that reaction of a 4-acyloxy-3-caranol with certain dehydrating agents results in the formation of a 4-acyloxy-3(10)-carene and a novel 2-acyloxy-4-isopropenyl-1-methylbicyclo[3.1.0] hexane. It has further been discovered that the relative proportion of the 4-acyloxy-3(10)-carene to the 2-acyloxy-4-isopropenyl - 1 - methylbicyclo[3.1.0]hexane is directly dependent upon the stereochemical configuration of the hydroxyl and acyloxyl groups in the 4-acyloxy-3-caranol starting material.

The alcohol and ketone derivatives of the novel 4-isopropenylbicyclo[3.1.0]hexane compounds have been discovered and are also a part of this invention. All of the above described compounds have highly desirable odor characteristics and are, therefore, primarily useful in the perfume arts, particularly as components of perfume compositions.

Accordingly, an object of this invention is to provide novel reactions of 4-acyloxy-3-caranols.

It is a more specific object of this invention to provide novel reactions of cis-4-acyloxy-3-caranols.

It is another more specific object of this invention to provide novel reactions of trans-4-acyloxy-3-caranols.

It is a further object of this invention to provide novel odorifereous 4 - isopropenyl-1-methylbicyclo[3.1.0]hexane compounds.

The above and other objects can be achieved by a novel chemical process, which comprises: reacting a 4-acyloxy-3-caranol compound of the general Formula I (I)

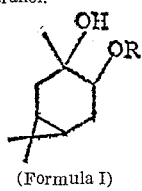

with a dehydrating agent to form a compound selected from the group consisting of a 4-acyloxy-3(10)-carene of the general Formula II, (II)

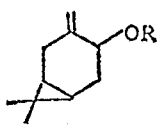

a 2 - acyloxy-4-isopropenyl-1-methylbicyclo[3.1.0]hexane of the general Formula III, (III)

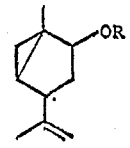

and mixtures thereof, wherein the symbol R in each of the above general Formulas I, II and III represents an acyl group of from 2 to 5 carbon atoms.

Examples of specific 4-acyloxy-3-caranols of Formula I and the corresponding Formulas II and III products are shown in FIGURE 1.

FIGURE 1

| Acyl Group "R" | Starting Material: Cis- or trans-4-acyloxy-3-caranol: (Formula I) | Product: 4-acyloxy-3(10)-carene: (Formula II) | Product: 2-acyloxy-4-isopropenyl-1-methylbicyclo[3.1.0]hexane: (Formula III) |
|---|---|---|---|
| O<br>‖<br>—C—CH₃ | Cis-3,4-caranediol 4-acetate; trans-3,4-caranediol 4-acetate. | 3 (10)-caren-4-ol acetate | 2-hydroxy-4-isopropenyl-1-methylbicyclo[3.1.0]-hexane acetate. |
| O<br>‖<br>—C—C₂H₅ | Cis-3,4-caranediol 4-propionate; trans-3,4-caranediol 4-propionate. | 3 (10)-caren-4-ol propionate | 2-hydroxy-4-isopropenyl-1-methylbicyclo[3.1.0]-hexane propionate. |
| O<br>‖<br>—C—C₃H₇ | Cis-3,4-caranediol 4-butyrate; trans-3,4-caranediol 4-butyrate. | 3 (10)-caren-4-ol butyrate | 2-hydroxy-4-isopropenyl-1-methylbicyclo[3.1.0]-hexane butyrate. |
| O<br>‖<br>—C—C₄H₉ | Cis-3,4-caranediol 4-valerate; trans-3,4-caranediol 4-valerate. | 3 (10)-caren-4-ol valerate | 2-hydroxy-4-isopropenyl-1-methylbicyclo[3.1.0]-hexane valerate. |

It is surprising that 4-acyloxy-3-caranols of Formula I undergo the type of dehydration reaction described above. A particularly unexpected feature of this reaction is the fact that the stereochemistry of the 4-acyloxy-3-caranol reactant directly influences the relative proportions of the products. More specifically when the starting material is a cis-4-acyloxy-3-caranol, the weight ratio of the 4-acyloxy-3(10)-carene product (Formula II) to the 2-acyloxy-4-isopropenyl - 1 - methyl - bicyclo[3.1.0]hexane product (Formula III) is greater than about 50:1. On the other hand, when the starting material is a trans-4-acyloxy-3-caranol, the weight ratio of Formula II product to Formula III product is generally within the range of from about 1:2 to about 2:1. A mixture of cis- and trans-4-acyloxy-3-caranols can also be advantageously used as the starting material. In this instance, the proportion of Formula II product to Formula III product can be, correspondingly, between the above-stated ranges.

The 4-acyloxy-3-caranol (Formula I) starting material in the dehydration reaction of the present invention is a derivative of the well known and naturally occurring compound (+)-3-carene and can be prepared from (+)-3-carene via a 3,4-caranediol intermediate. More specifically, trans-3,4-caranediol can be prepared by reacting (+)-3-carene with an organic peracid followed by treatment with an aqueous medium according to the disclosure of Schmidt et al. in Chem. Ber. 96, 2636 (1963). Cis-3,4-caranediol can be prepared by reacting (+)-3-carene with osmium tetroxide followed by aqueous treatment in the same manner as disclosed by Baran in J. Org. Chem. 25, 257 (1960). The 4-acyloxy-3-caranol starting material can then be prepared by acylating the cis- or trans-3,4-caranediol with an acid anhydride in pyridine. For example, cis-4-acyloxy-3- caranols can readily be prepared by the reaction of cis-3,4-caranediol with $(R)_2O$ (wherein R is an acyl group of from 2 to 5 carbon atoms) in pyridine. Likewise trans-4-acyloxy-3-caranols can readily be prepared by the reaction of trans-3,4-caranediol with $(R)_2O$ in pyridine.

As illustration of a specific case (where R=acetate), cis- or trans-3,4-caranediol 4-acetate can be prepared by the respective reaction of cis- or trans-3,4-caranediol with a 1:2 mixture by volume of acetic anhydride and pyridine, overnight at 25° C. followed by dilution with water, extraction with ether, and distillation.

The above-described reactions are illustrated schematically in FIGURE 2.

oxybromide and phosphorous oxyiodide represent a preferred class of dehydrating agents. Phosphorous oxychloride is an especially preferred member of this class.

Arylsulfonyl halides such as p-toluenesulfonyl chloride or benzenesulfonyl chloride represent another class of dehydrating agents that can be advantageously used herein. The arylsulfonyl chlorides, preferably of from about 6 to about 9 carbon atoms in the aryl group, are preferred members of this class. More preferably, aryl is selected from the group consisting of benzene, toluene, p-halobenzene and p-nitrobenzene.

Alkylsulfonyl halides such as methanesulfonyl chloride represent still another class of dehydrating agents for use herein. The alkylsulfonyl chlorides, preferably of from 1 to about 6 carbon atoms in the alkyl group, are preferred members of this class.

Additional dehydrating agents that can be used herein are trifluoroacetyl halides, preferably trifluoroacetyl chloride; and sulfur oxyhalides, preferably thionyl oxychloride.

It is believed that the dehydration reaction proceeds via the formation of an ester intermediate on the 3-hydroxyl group, e.g., a dichlorophosphoridate when phosphorous oxychloride is the dehydrating agent, followed by elimination to form the specified product. The dehydration reaction is therefore preferably carried out in the presence of an organic base, more preferably in the presence of at least 2 mole equivalents of base for each mole of 4-acyloxy-3-caranol starting material. The organic base should be one which will facilitate both the initial ester formation and the subsequent elimination reaction without promoting a competing displacement of the ester intermediate. The organic base is preferably an amine.

Heterocyclic amines generally have the above-described properties and represent a preferred class of organic bases for use with the dehydration reaction. Preferably, the heterocyclic amine contains from about 4 to about 10

Figure 2

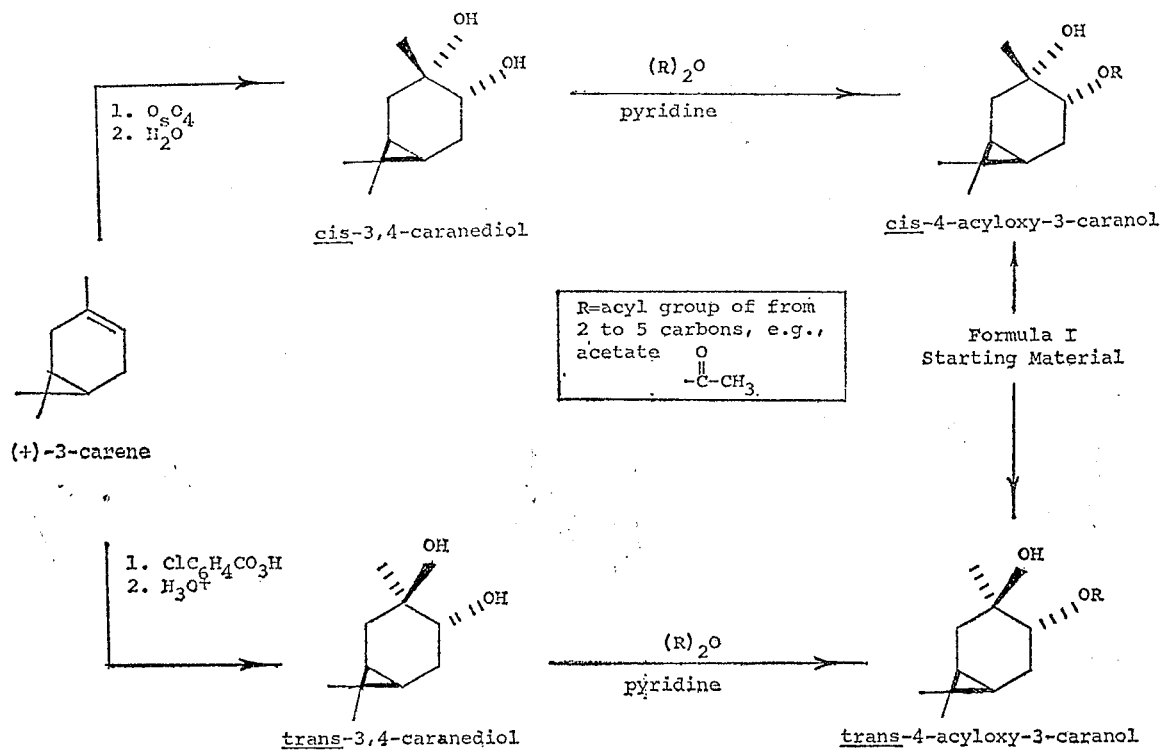

As stated previously, the 4-acyloxy-3-caranol compound of Formula I is reacted with a dehydrating agent to form Formula I and Formula II products. Phosphorous oxyhalides such as phosphorous oxychloride, phosphorous carbon atoms, e.g., pyridine, picoline, lutidine, collidine, isoquinoline, quinalidine, pyrrolidine, piperidine and morpholine. Pyridine is a highly preferred member of this class.

Aryl amines represent another class of organic bases that can be advantageously used herein. Preferably, the aryl amine contains from about 6 to about 8 carbon atoms, e.g., aniline, toluidine, anisidine, and phenetidine.

Alkyl amines represent still another class of organic bases useful herein. Preferably, the alkyl amine contains from about 4 to about 9 carbon atoms, e.g., diethylamine, triethylamine, tri-n-propylamine and ethylenediamine.

The dehydration reaction is preferably carried out in a solvent medium under conditions of homogeneity. It is preferable to use the organic base as the solvent. Optionally, an inert solvent may comprise up to about 90% by weight, preferably up to about 50% by weight, of the reaction medium which consists of the starting material, an organic base, and the dehydrating agent in addition to the inert solvent. Suitable inert solvents include: saturated hydrocarbons, preferably of from about 5 to about 12 carbon atoms, e.g., hexane, cyclohexane, dodecane and the like; aromatic hydrocarbons, preferably of from about 6 to about 9 carbon atoms, e.g., benzene or toluene; and polyhalogenated hydrocarbons, preferably of from about 1 to about 10 carbon atoms, e.g., chloroform, tetrachloroethylene, and the like.

Preferably, the concentration of the 4-acyloxy-3-caranol starting material in the reaction medium ranges from about 0.001 M to about 5 M, more preferably from about 0.01 M to about 0.5 M. Preferably, the concentration of the dehydrating agent in the reaction medium ranges from about 0.01 M to about 10 M, more preferably, from about 0.2 M to about 5.0 M.

The dehydration reaction is preferably carried out at a temperature ranging from about 25° C. to about 250° C. more preferably, from about 80° C. to about 100° C., with stirring or other mild agitation. It is desirable to carry out the reaction in the presence of an inert gas such as nitrogen, argon or the like.

Although the time of the dehydration reaction is dependent on such factors as concentration of the starting material and dehydrating agent, the specific organic base or solvent, specific temperature employed and the like, the reaction is generally complete within a time ranging from about 15 minutes to about 10 hours, more usually from about 2 hours to about 4 hours.

The products of the above-described reaction, i.e., the 4-acyloxy-3(10)-carene and the 2-acyloxy-4-isopropenyl-1-methylbicyclo[3.1.0]hexane can be separated from the reaction mixture and from each other by conventional extraction, distillation and chromatographic techniques. More specifically, these products are preferably removed from the reaction mixture by extraction with ether and removal of the ether by distillation. The products can then be separated from each other by gas chromatography.

The novel 2-acyloxy-4-isopropenyl-1-methylbicyclo-[3.1.0]hexane product can be reacted with lithium aluminum hydride (preferably in an ether solvent) or other similar reducing agents to form the novel alcohol 2-hydroxy-4-isopropenyl-1-methylbicyclo[3.1.0]hexane. This alcohol can in turn be oxidized with dilute (1–5 M) chromic acid or other similar oxidizing agents to form the novel ketone 4-isopropenyl-1-methylbicyclo[3.1.0] hexan-2-one. These reactions are illustrated schematically in FIGURE 3.

Thus, this invention provides novel 4-isopropenyl-1-methylbicyclo[3.1.0]hexane compounds of the general formula

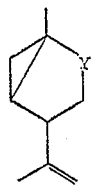

wherein $y$ is selected from the group consisting of

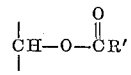

[Formula III product]

[the above-described alcohol]

and

[the above-described ketone]

and R' is an alkyl group of from 1 to 4 carbon atoms.

The compounds prepared by the novel reaction of this invention have desirable and useful odors. The 4-acyloxy-3(10)-carene compounds have odors generally characterized as floral-camphoraceous. The 2-acyloxy-4-isopropenyl-1-methylbicyclo[3.1.0]hexane compounds have odors generally characterized as woody-camphoraceous. Mixtures comprising a 4-acyloxy-3(10)-carane compound and a 2 - acyloxy-4-isopropenyl-1-methylbicyclo[3.1.0]-hexane compound have odors that are generally characterized as spicy-camphor with animal and/or hay side notes. The 2-hydroxy - 4 - isopropenyl-1-methylbicyclo-[3.1.0]hexane has a minty-camphoraceous odor. The 4-isopropenyl-1-methylbicyclo[3.1.0]hexan-2-one has strong sweet clove odor with a hay side note.

The above compounds can be used individually, or in admixture with each other, as odorants per se or as components of perfume compositions for ultimate use in products such as soaps, detergents, deodorants and the like. Perfume compositions containing odoriferously effective amounts, e.g., 0.0001% to about 50%, of any of the above-described compounds are desirable and useful. More specific illustrations of the perfume utility of these compounds are found in Examples VI to VIII hereinafter.

EXAMPLES

The following examples illustrate specific preferred embodiments of the invention and are not intended to be limiting. All percentages and ratios in the following examples, as well as in this specification and the appended claims are by weight unless otherwise indicated.

Data listed in all of the examples were obtained by means of the following instruments and techniques unless otherwise indicated: Ultraviolet spectra were determined in absolute ethanol with a Cary model 14 spec-

FIGURE 3

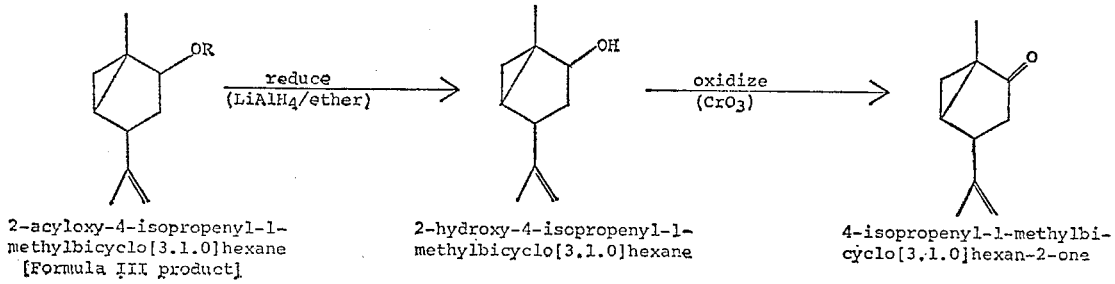

trophotometer, and infrared spectra were obtained on neat samples with a Perkin-Elmer Infracord spectrophotometer. Optical rotations were measured in absolute ethanol. Melting points were determined on a micro hot-stage and are calibrated, corrected and shown in degrees centigrade as are all other temperatures. Gas chromatographic analyses were performed on an Aerograph model A–90P instrument using 5-ft. or 10-ft. x 0.25 in. columns packed with (A) 20% Carbowax 20M (a conventional polyester column packing) on 60/80-mesh fire brick or (B) 20% SE–30 (a conventional silicone column packing) on 60/80-mesh Chromosorb W. The elution order used in the column chromatography was hexane, benzene, ether, and ethyl acetate. Nuclear magnetic resonance (N.M.R.) spectra were determined under the supervision of Dr. T. J. Flautt of The Procter & Gamble company, Miami Valley Laboratories, Cincinnati, Ohio, in deuteriated chloroform solution with a Varian model HA–100 or A–60 spectrometer, using tetramethylsilane as an internal standard. The N.M.R. data are noted by multiplicity (S=singlet) d=doublet, t=triplet, q=quartet, and m=unresolved multiplet), integration, coupling constant (given in c.p.s.), and assignment. Mass spectra were obtained by Dr. J. H. Collins and associates of the above laboratories using an Atlas Model CH–4 spectrometer. The mass spectral data reported include the parent peak, if present, and other significantly intense peaks appearing above the lowest m./e. value noted. Microanalyses were performed by Spang Microanalytical Laboratories, Ann Arbor, Mich.

EXAMPLE I

Dehydration of trans-3,4-caranediol 4-acetate to form 3(10)-caren-4-ol acetate and 2-hydroxy-4-isopropenyl-1-methylbicyclo[3.1.0]hexane acetate A solution containing 9.70 g. of (-)-trans-3,4-caranediol 4-acetate (0.055 M) and 82.6 ml. of phosphorous oxychloride (1.1 M) in 826 ml. of pyridine was maintained at 100° under an atmosphere of nitrogen for three hours. The resulting brown solution was poured over ice water and exhaustively extracted with ether. The ether extracts were combined and washed with 10% hydrochloric acid and dried over saturated sodium chloride solution followed by anhydrous sodium sulfate. Removal of the solvent by distillation gave 6.88 g. of amber residue which was shown by gas chromatography to contain 3(10)-caren-4-ol acetate (34%) and 2-hydroxy-4-isopropenyl-1-methylbicyclo[3.1.0]hexane acetate (31%), which were purified by preparative gas chromatography. Also observed were peaks corresponding to lower molecular weight material (13–17%) and additional unidentified olefinic acetates (6–7%). From among the former fractions, peaks were isolated having retention times and infrared and N.M.R. spectra identical with p-cymene, α,p-dimethylstyrene and 1,1,4-trimethylcycloheptatriene.

The 2-hydroxy-4-isopropenyl-1-methylbicyclo[3.1.0]-hexane acetate was obtained as a colorless oil having a woody-camphoraceous odor, B.P. 72–74° (1.2 mm.); $[\alpha]_D^{25}$ −18° (c.l. 38); $\lambda_{max}$ 5.80, 6.08, and 11.24μ; N.M.R. spectrum: τ4.82 (d., 1, J 4.5, CH—2), 5.26 (d., 2, =CH$_2$), 6.96 (m., 1, CH—4), 7.94 (s., 3, —OCOCH$_2$), 8.26 (s., 3, =CH$_3$), 8.86 (s., 3, CH$_3$—1), and 9.58 (m., 2, CH$_2$—6), m./e.: 152, 137, 134, 119.

Analysis.—Calc'd for $C_{12}H_{18}O_2$ (percent): C, 74.19; H, 9.34. Found (percent): C, 74.0; H, 9.3.

The compound was thus formally characterized as (—)-2-endo-hydroxy-4-exo-isopropenyl-1-methylbicyclo-[3.1.0]hexane.

The 3(10)-caren-4-ol acetate was obtained as a colorless oil having a floral-camphoraceous odor, B.P. 80–82° (1.2 mm.); $[\alpha]_D^{25}$ −12° (c.l. 1.38); $\lambda_{max}$ 5.75 and 11.14μ; N.H.R. spectrum: τ4.86 (t., 1, CH—4), 5.15 (m., 2, CH$_2$—103, 7.96 (s., 3, —OCOCH$_3$), 8.98 (s., 3, CH$_3$—9), and 9.08 (s., 3, CH$_3$—8).

Analysis.—Calc'd for $C_{12}H_{18}O_2$ (percent): C, 74.19; H, 9.34. Found (percent): C, 74.4; H, 9.3

This compound was thus formally identified as (—)-3(10)-caren-4α-ol acetate.

When other trans-4-acyloxy-3-caranols of from 2 to 5 carbon atoms in the acyl group, e.g., the trans isomers of Formula I starting materials listed in FIGURE 1, are substituted for the trans-3,4-caranediol 4-acetate starting material of this example, the corresponding 4-acyloxy-3(-0)-carene and 2-acyloxy-4-isopropenyl-1-methylbicyclo[3.1.0]hexane products of FIGURE 1 are formed e.g., substitution of trans-3,4-caranediol 4-valerate for the starting material gives 3(10)-caren-4-ol valerate and 2-hydroxy-4-isopropenyl-1-methylbicyclo[3.1.0]hexane valerate as the products.

EXAMPLE II

Dehydration of trans-3-4-caranediol 4-butyrate to form 3(10)-caren-4-ol butyrate and 2-hydroxy-4-isopropenyl-1-methylbicyclo[3.1.0]hexane butyrate A solution containing 865 mg. of trans-3,4-caranediol 4-butyrate (0.229 M) and 1.7 ml. of phosphorous oxychloride (1.1 M) in 17 ml. of pyridine was stirred at 100° C. for three hours under an atmosphere of nitrogen. Isolation of the product mixture in the same manner as in Example I, supra, gave 820 mg. of a dark amber liquid. Short-path distillation of this liquid at 100° C. (0.2 mm.) gave a 1:1 mixture of 3(10)-carene-4α-ol butyrate and 2-endo-hydroxy-4-exo-isopropenyl-1-methylbicyclo[3.1.0]hexane butyrate as a colorless liquid having a spicy-camphor, animal-hay odor, $[\alpha]_{5461}^{25}$ −16° (c. 1.04); $\lambda_{max}$ 5.76.

Analysis.—Calc'd for $C_{14}H_{22}O_2$ (percent): C, 75.63; H, 9.97. Found (percent): C, 75.5; H, 9.8.

When other trans-4-acyloxy-3-caranols of from 2 to 5 carbon atoms in the acyl group, e.g., the trans isomers of Formula I starting materials listed in FIGURE 1, are substituted for the trans-3,4-caranediol 4-butyrate starting material of this example, the corresponding 4-acyloxy-3(10)-carene and 2-acyloxy-4-isopropenyl-1-methylbicyclo[3.1.0.]hexane products are formed, e.g., substitution of trans-3,4-caranediol 4-propionate gives 3(10)-caren-4-ol propionate and 2-hydroxy-4-isopropenyl-1-methylbicyclo[3.1.0.]hexane propionate.

EXAMPLE III

Dehydration of cis-3,4-caranediol 4-acetate to form 3(10)-caren-4-ol acetate and 2-hydroxy-4-isopropenyl-1-methylbicyclo[3.1.0]hexane acetate A solution containing 958 mg. of (—)-cis-3,4-caranediol 4-acetate (0.225 M) and 2 ml. of phosphorous oxychloride (1.1 M) in 20 ml. of pyridine was maintained at 100° under an atmosphere of nitrogen for three hours. Isolation as described above in Example I gave 860 mg. of amber residue which was shown by gas chromatography to consist of 1,1,4-trimethylcycloheptatriene (7% yield, N.M.R. spectrum identical with that of an authentic sample prepared by dehydration of eucarvol), p-cymene (7%), α,p-dimethylstyrene (7%), additional unidentified low-molecular weight products (27%), 3(10)-caren-4-ol-acetate (42%, identical in all respects with the sample described above in Example I), and additional unidentified olefinic acetates (17%). A peak which appeared at the position corresponding to 2-hydroxy-4-isopropenyl-1-methylbicyclo[3.1.0]hexane acetate amounted to slightly less than 2% of the total material.

When other cis-4-acyloxy-3-caranols of from 2 to 5 carbon atoms in the acyl group, e.g., the cis isomers of Formula I starting materials listed in FIGURE 1, are substituted for the cis-3,4-caranediol 4-acetate starting material of this example, the corresponding 4-acyloxy-3(10)-carene and 2-acyloxy-4-isopropenyl-1-methylbicyclo[3.1.0]hexane products of FIGURE 1 are formed, e.g., substitution of cis-3,4-caranediol 4-valerate for the starting material gives 3(10)-caren-4-ol valerate and 2-hydroxy - 4 - isopropenyl - 1 - methylbicyclo[3.1.0]hexane valerate as the products.

In all of the above Examples I, II and III, substantially equivalent results are observed in that the appropriate Formula II and Formula III products are formed when the phosphorous oxychloride of said examples is replaced by a dehydrating agent selected from the group consisting of: other phosphorous oxyhalides such as phosphorous oxybromide and phosphorous oxyiodide; arylsulfonyl halides such as p-toluenesulfonyl chloride, benzenesulfonyl chloride, p-chlorobenzenesulfonyl chloride, and p-nitrobenzenesulfonyl chloride; alkylsulfonyl halides such as methanesulfonyl chloride; trifluoroacetyl halides such as trifluoroacetyl chloride; and sulfur oxyhalides such as thionyl oxychloride.

Also in the above Examples I, II and III, substantially equivalent results are observed in that the appropriate Formula II and Formula III products are formed when the pyridine used in said examples is replaced by an organic base selected from the group consisting of: amines; other heterocyclic amines such as picoline, lutidine, collidine, isoquinoline, quinalidine, pyrrolidine, piperidine and morpholine; aryl amines such as aniline, toluidine, anisidine and phenetidine; alkyl amines such as diethylamine, triethylamine, tri-n-propylamine and ethylenediamine.

Also in the above Examples I, II and III, substantially equivalent results are obtained in that the appropriate Formula II and Formula III products are formed when up to 90% by weight of the pyridine used in said examples is replaced by an inert solvent selected from the group consisting of: saturated hydrocarbons such as hexane, cyclohexane, dodecane and the like; aromatic hydrocarbons such as benzene or toluene; and polyhalogenated hydrocarbons such as chloroform, tetrachloroethylene and the like.

EXAMPLE IV

Reduction of 2 - hydroxy - 4 - isopropenyl - 1 - methylbicyclo[3.1.0]hexane to form 2 - hydroxy - 4 - isopropenyl - 1 - methylbicyclo[3.1.0]hexane A solution containing 3.54 g. (18.2 moles) of a 27:24 mixture of (—)-3(10) - caren - 4 - ol acetate and (—)-2 - hydroxy - 4 - isopropenyl - 1 - methylbicyclo[3.1.0]hexane acetate in 20 ml. of ether was added dropwise with cooling to a solution of 2.96 g. (78.2 mmoles) of lithium aluminum hydride in 20 ml. of ether. After two hours, isolation by dilution with water and extraction with ether gave 3.32 g. of a pale yellow oil after removal of the solvent by distillation. Further purification by preparative gas chromatography followed by short-path distillation at 71.5°–72° (1.0 mm.) gave 2-hydroxy-4-isopropenyl-1-methylbicyclo[3.1.0]hexane as a colorless oil having a minty-camphoraceous odor, $\lambda_{max}$ 2.90, 6.04, and 11.22$\mu$; N.M.R. spectrum: $\tau$5.24 (d., 2, $=CH_2$), 588 (d., 1, J 4.8, CH—2), 6.92 (m., 1, CH—4), 8.26 (s., 3, $=CCH_3$), 8.76 (s., 3, $CH_3$—1), and 9.6 (m., 2, $CH_2$—6).

Analysis.—Calc'd for $C_{10}H_{16}O$ (percent): C, 78.89; H, 10.59. Found (percent): C, 78.9; H, 10.3.

This compound was thus formally identified as 2-endo-hydroxy-4-exo-isopropenyl - 1 - methylbicyclo[3.1.0]hexane.

EXAMPLE V

Oxidation of 2 - hydroxy-4-isopropenyl-1-methylbicyclo[3.1.0]hexane to form 4-isopropenyl-1-methylbicyclo[3.1.0]hexan-2-one Titration of a solution of 744 mg. of the mixture obtained as described above in Example IV in 20 ml. of acetone with one equivalent of 2.67 M chromic acid solution gave 772 mg. of a yellow oil. Isolation of the major component, present in 52% yield, by preparative gas chromatography (column A) followed by short-path distillation at 84°–85° (1.5 mm.) gave (+)-4-isopropenyl-1-methylbicyclo[3.1.0]hexan-2-one as a colorless liquid having a strong sweet clove odor with a hay side note, $[\alpha]_{5461}^{25}$+137.5° (c. 2.38); $\lambda_{max}$ 5.78, 6.06, and 11.22$\mu$; $\lambda_{max}$ 251$\mu$ ($\epsilon$166); N.M.R. spectrum: $\tau$5.14 (s., 2, $=CH_2$), 6.98 (m. 1, CH4), 8.19 (s., 3, $=CCH_3$), 876 (s., 3, $CH_3$—1), and 8.95 (m., 3, $CH_2$—6 and CH—5); m./e.: 150, 134, 122.

Analysis.—Calc'd. for $C_{10}H_{14}O$ (percent): C, 79.95; H, 9.39. Found (percent): C, 79.9; H, 9.6.

This compound was thus formally identified as (+)-4-exoisopropenyl-1-methylbicyclo[3.1.0]hexan-2-one.

EXAMPLE VI

Perfume Compositions

Perfume compositions are prepared by intermixing the components shown below:

Perfume Composition A

| Component | Percent by wt. |
|---|---|
| 3(10)-caren-4-ol acetate [1] | 5.0 |
| 2-hydroxy - 4 - isopropenyl - 1-methylbicyclo[3.1.0]-hexane acetate. [1] | 5.0 |
| 2-hydroxy - 4 - isopropenyl - 1-methylbicyclo[3.1.0]hexane (from Example IV, supra). | |
| Bornyl acetate | 30.0 |
| Cedarleaf | 2.0 |
| Cedarwood | 18.0 |
| Eucalyptus | 10.0 |
| Pine oil | 10.0 |
| Turpentine | 20.0 |

[1] A 1.1 : 1 mixture of Formula II and Formula III products from Example I, supra.

This perfume composition exhibits a highly desirable and useful pine bouquet odor.

When the 3(10)-caren-4-ol acetate and 2-hydroxy-4-isopropenyl-1-methylbicyclo[3.1.0]hexane acetate are respectively replaced by other Formula II and Formula III products, e.g., the Formula II and Formula II products of FIGURE 1, supra, substantially equivalent results are observed in that the perfume composition exhibits a highly desirable and useful pine bouquet odor.

Perfume Composition B

| Component | Percent by wt. |
|---|---|
| 3(10)-caren-4-ol butyrate [1] | 3.0 |
| 2-hydroxy - 4 - isopropenyl - 1-methylbicyclo[3.1.0]hexane butyrate. [1] | 3.0 |
| 4-isopropenyl - 1 - methylbicyclo[3.1.0]hexane-2-one (from Example V, supra). | |
| Bergomot | 7.0 |
| Coumarin | 4.0 |
| Vanillin | 0.5 |
| Lavender | 35.5 |
| Opoponax | 3.0 |
| Patchouli | 3.0 |
| Sandalwood | 8.0 |
| Spike lavender | 35.0 |

[1] A 1 : 1 mixture of Formula II and Formula III products from Example II, supra.

This perfume composition exhibits a highly desirable and useful lavender odor.

When the 3(10)-caren-4-ol butyrate and 2-hydroxy-4-isopropenyl-1-methylbicyclo[3.1.0]hexane butyrate are respectively replaced by other Formula II and Formula III products, e.g., the Formula II and Formula III products of FIGURE 1, supra, substantially equivalent results are observed in that the perfume composition exhibits a highly desirable and useful lavender odor.

As discussed hereinbefore, the compounds prepared by the novel reaction of this invention are useful in various perfume compositions. Thus, the components and proportions in the perfume compositions of this example can be adjusted according to methods well known in the perfume art to form a wide variety of desirable perfume compositions containing odoriferously effective amounts of Formula II and/or Formula III products of this invention.

EXAMPLE VII

Detergent Compositions

A conventional heavy-duty built detergent having the following composition is prepared:

| Component | Percent by wt. |
|---|---|
| Sodium dodecyl benzene sulfonate | 20.0 |
| Sodium tripolyphosphate | 50.0 |
| Sodium silicate | 6.0 |
| Sodium sulfate | 14.0 |
| Water | 9.8 |
| Perfume Composition A of Example VI | 0.2 |

This detergent composition exhibits a highly desirable pine bouquet odor. When perfume Composition B of Example VI is substituted for perfume Composition A herein, the detergent composition exhibits a highly desirable lavender odor. The other perfume compositions of Example VI employing odoriferously effective amounts of Formula II and/or Formula III products of this invention can be substituted on a weight basis for the perfume composition in the detergent composition of this example according to methods well known in the perfume art.

EXAMPLE VIII

Detergent Bar Compositions

A conventional household detergent bar having the following composition is prepared:

| Component | Percent by wt. |
|---|---|
| Sodium soap | 75.0 |
| Potassium soap[1] | 7.5 |
| Water | 15.0 |
| Perfume Composition B of Example VI | 2.5 |

[1] The total soap comprises a mixture of 80% tallow soap and 20% coconut soap.

This detergent bar exhibits a highly desirable lavender odor. When perfume Composition A of Example VI is substituted for perfume Composition B herein, the detergent bar exhibits a highly desirable pine bouquet odor. Other perfume compositions of Example VI employing odoriferously effective amounts of Formula II and/or Formula III products of this invention can be substituted on a weight basis for the perfume composition in the detergent bar of this example according to methods well known in the perfume art.

What is claimed is:

1. The novel chemical process which comprises: reacting a 4-acyloxy-3-caranol compound of the general formula,

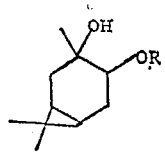

with a dehydrating agent selected from the group consisting of phosphorous oxyhalides, arylsulfonyl halides, alkylsulfonyl halides, trifluoroacetyl halides and sulfur oxyhalides to form a compound selected from the group consisting of a 4-acyloxy-3-(10)-carene of the general formula,

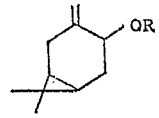

a 2 - acyloxy-4-isopropenyl-1-methylbicyclo[3.1.0]-hexane of the general formula,

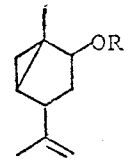

and mixtures thereof, wherein the symbol R in each of the above general formulas represents an alkanoyl group of from 2 to 5 carbon atoms.

2. The process of claim 1 wherein the starting material is a cis-4-acyloxy-3-caranol.

3. The process of claim 1 wherein the starting material is a trans-4-acyloxy-3-caranol.

4. The process of claim 1 wherein the dehydrating agent is phosphorous oxychloride.

5. The process of claim 1 wherein the reaction is carried out in the presence of an organic base.

6. The process of claim 5 wherein the organic base is selected from the group consisting of heterocyclic amines, aryl amines and alkyl amines.

7. The process of claim 6 wherein the organic base is pyridine.

8. The process of claim 5 wherein the reaction is carried out in the presence of an inert solvent.

9. Novel 4-isopropenyl - 1 - methylbicyclo[3.1.0]hexane compounds of the general formula

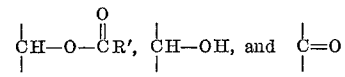

wherein Y is selected from the group consisting of $$\overset{|}{\underset{|}{C}}H-O-\overset{O}{\overset{\|}{C}}R', \quad \overset{|}{\underset{|}{C}}H-OH, \text{ and } \overset{|}{\underset{|}{C}}=O$$

and R' is an alkyl group of from 1 to 4 carbon atoms.

References Cited

Schmidt, Ber. Deut. Chem., vol. 62, 1929, pp. 103–07.

LORRAINE A. WEINBERGER, Primary Examiner

V. GARNER, Assistant Examiner

U.S. Cl. X.R.

260—587, 631.5; 252—522